M. SCHOEKE.
VEHICLE WHEEL.
APPLICATION FILED MAR. 15, 1921.

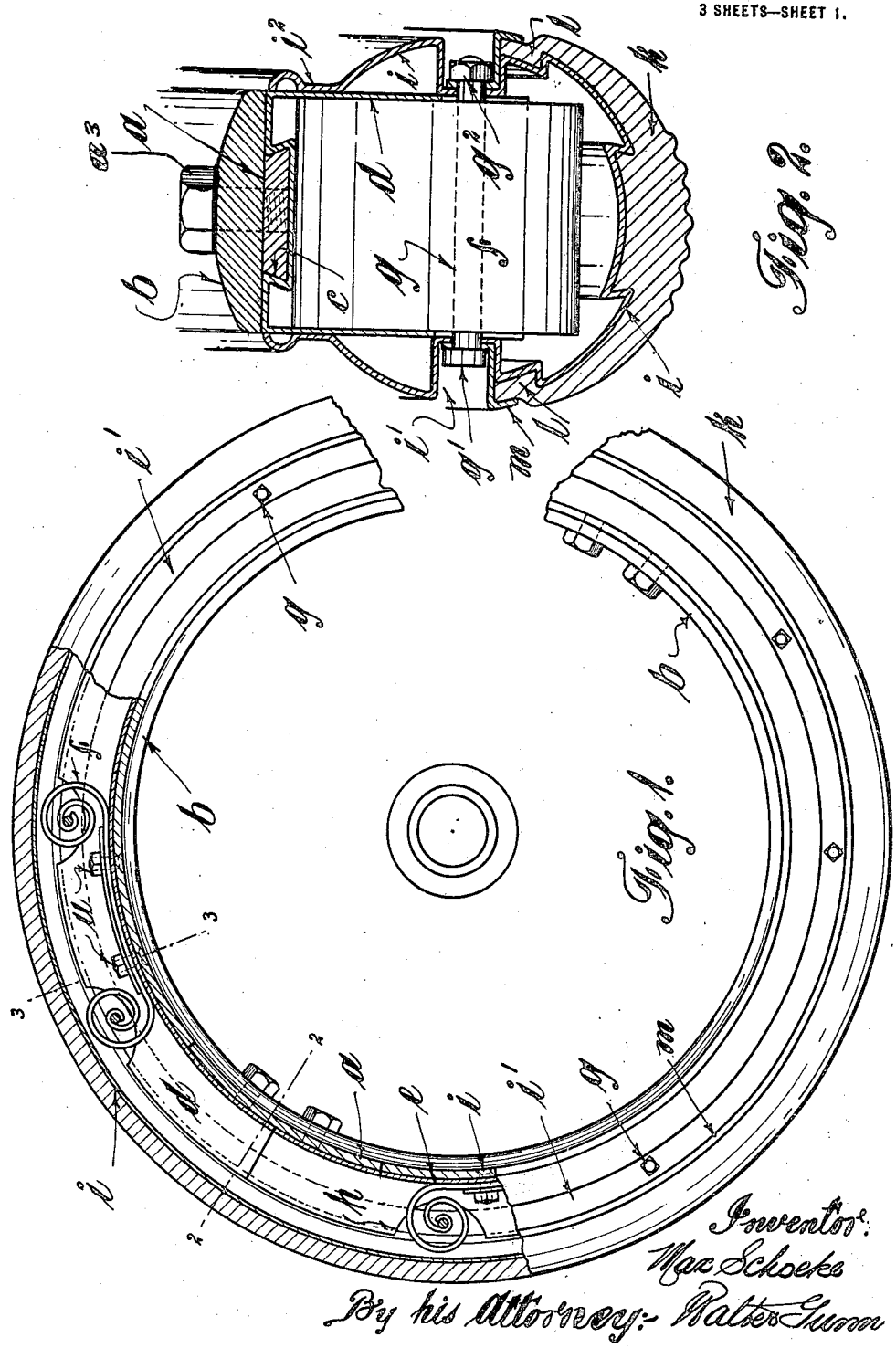

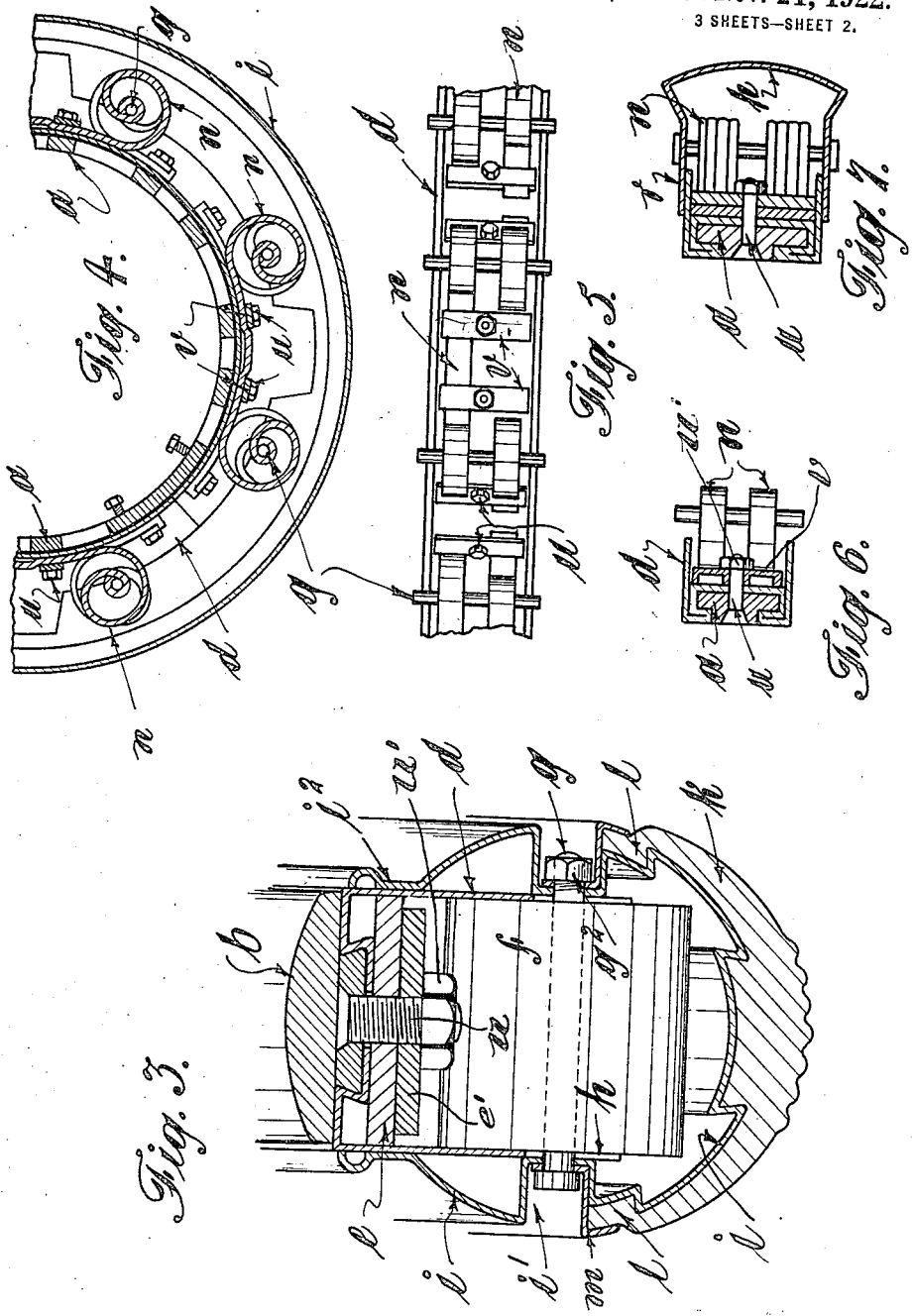

1,436,116.

Patented Nov. 21, 1922.
3 SHEETS—SHEET 3.

Inventor:
Max Schoeke.
By his Attorney: Walter Gunn

Patented Nov. 21, 1922.

1,436,116

UNITED STATES PATENT OFFICE.

MAX SCHOEKE, OF MANCHESTER, ENGLAND.

VEHICLE WHEEL.

Application filed March 15, 1921. Serial No. 452,557.

(GRANTED UNDER THE PROVISIONS OF THE ACT OF MARCH 3, 1921, 41 STAT. L., 1313.)

*To all whom it may concern:*

Be it known that I, MAX SCHOEKE, a citizen of Carlsruhe, in the Grand Duchy of Baden, Germany, residing at Manchester, England, have invented new and useful Improvements in or Relating to Vehicle Wheels (for which I have filed an application in Great Britain Oct. 25, 1919, Patent No. 159,252), of which the following is a specification.

This invention relates to vehicle wheels of the elastic type wherein steel springs are used to obtain the desired resiliency, and has for its object to provide an improved constructional form of elastic ring or tyre, The invention will be described by the aid of the accompanying drawings, in which:

Fig. 1 is a part sectional elevation of a wheel rim and tyre constructed according to the invention.

Fig. 2 is a transverse section on the line 2, 2 Figure 1, drawn to an enlarged scale.

Fig. 3 is a transverse section on the line 3, 3 Figure 1, drawn to an enlarged scale.

Fig. 4 is a view corresponding to Figure 1 of one half of a tyre slightly modified.

Fig. 5 is an inverted plan of Figure 4 with the outer cover removed.

Figs. 6 to 9 are detail sectional views showing modified ways of forming or assembling the improved tyre.

In carrying the invention into effect according to Figures 1 to 3 a steel rim $a$ is provided adapted to be attached to the felly $b$ of the wheel by means of the screws $a^3$. Said rim $a$ is broader on the external face than the internal face to engage a dovetail groove $c$ in the periphery of a sheet metal trough $d$ or guide formed in two or more segments, the rim $a$ also being formed in segments the ends of which may abut to form a complete rim as shown in Figure 1, or which may be placed at intervals around the wheel as shown in Figure 4.

In assembling the wheel, the segments of the casing $d$ are each provided with their respective segment or segments of the rim $a$ these latter being inserted endwise and the segments of the casing $d$ being then assembled together.

Flat spiral springs $e$ are secured to the rim $a$ by means of the clamping plates $e^1$, and studs $u$ passing through holes in the metal trough $d$ (see more particularly Figure 3,) with the convolutions $f$ lying transversely of said rim and carrying cross-pins $g$ passing through radial slots $h$ in the trough-like casing, there being one slot $h$ for each through bolt $g$ see Figure 1, or one for each pair of adjacent bolts see Figure 4, and a clamping plate $e^1$ being placed between the nuts $u^1$ and spring $f$. An all around hollow sheet metal tyre $i$ is provided which is somewhat circular in cross section. An all around groove $i^1$ is formed on each side of the tyre the bottom of the grooves $i^1$ being flat and bearing against the flat sides of the trough like casing $d$, the extreme edges $i^2$ of the tyre $i$ being opened out so as to be parallel to each other and bear against the said casing $d$.

A rubber-tread $k$ is provided which is semi-circular in cross section and is formed with beaded edges $l$ to engage grooves in the outer rim or tyre $i$, flanged rings $m$ Z-shape in cross section, being provided to secure the edges of the rubber tread in position, one flange of each ring $m$ entering the all around groove $i^1$ and being secured to the wheel by the cross-pins or bolts $g$, which project through holes in the bottom of the grooves $i$, one end of said bolts $g$ being provided with a head $g^1$ and the other end with a nut $g^2$ said heads and nuts lying within the grooves $i^1$.

Figure 8:
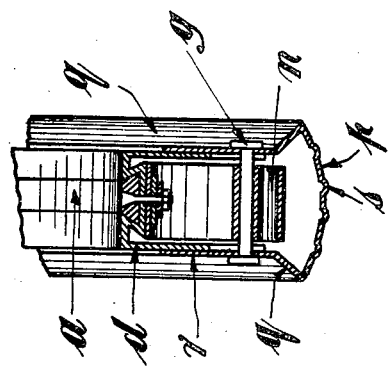
Figure 9:
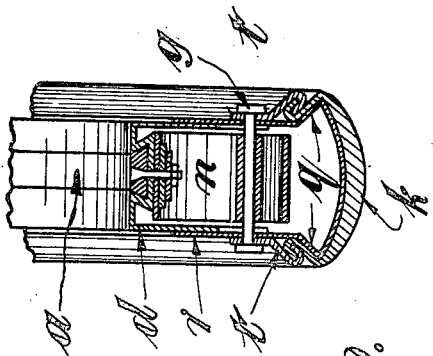
Figure 10:
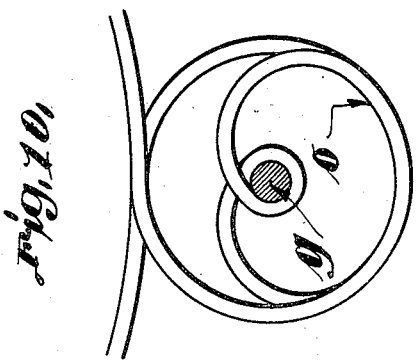
Fig. 10 shows in detail a modified form of spring.
Figure 11:
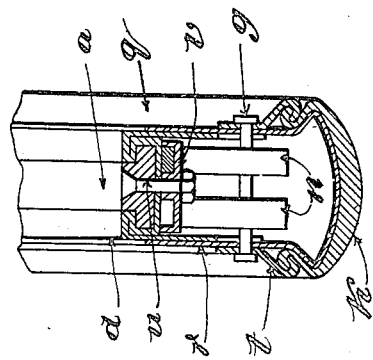
Fig. 11 shows a further form of assembling the improved tyre.

Instead of single flat spiral springs $e$ extending the whole width of the channel, a series of springs $n$ may be arranged transversely of the tyre as illustrated in Figures 4 to 7, and in Figure 11, said springs preferably being arranged in groups of three as shown, one spring of each group being secured to the rim between the respective cross bolts $g$ whilst the other springs of said groups extend to the right and left respectively of the same bolt $g$. Said springs may be of any desired cross sectional shape the metal forming the springs $n$ in Figures 4 to 6 being of ribbon shape while the springs $n$ shown in Figure 7 are round in cross section. The springs $n$ are secured to the rim $a$ by means of nuts $u^1$ bolts $u$ and clamping plates $v$ washers being used if desired as shown in Figs. 8 and 9. Figure 10 shows a spring $o$ in which the two ends are arranged to extend on either side of the respective bolt *q* for securing to the rim *a* by means of nuts and bolts *u* and clamping plates *v* as in the last example.

The rubber tread may be variously formed or if desired may be dispensed with entirely and the metal tyre corrugated as shown in Figure 8. In this case the metal tyre is curved on the tread *p* with the ends turned back, first radially at *q* and then parallel to each other at *r*. Corrugations *s* are formed in the tread *p* or a rubber tread may be provided as illustrated in Figure 9 wherein two side flanges or rings *t* are adapted to grip the edges of the rubber tread and secure the same in position, said side flanges being secured in position by the bolts *g*.

What I claim is:—

1. Elastic tyres for attachment to the wheels of vehicles, comprising segments of a rim, the external face of which is broader than the internal face, adapted to be rigidly secured to the wheel felly, a sheet metal trough or guide formed in segments and having a groove formed therein to engage the rim segments, spiral springs secured within said trough with the convolutions arranged transversely of the wheel, cross bolts carried by the inner most convolutions of the springs and an outer metal tyre supported on said cross bolts, substantially as described.

2. Elastic tyres for attachment to the wheels of vehicles, comprising segments of a rim, the external face of which is broader than the internal face, means to secure said segments to the felly of a wheel, a sheet metal annular trough formed in segments and having a groove formed therein to engage the rim segments, a plurality of spiral springs arranged side by side with their axes transversely of the wheel, and secured within said trough at equi-distant points around the circumference of the same, said springs being arranged in pairs with the convolutions wound in opposite directions and, with the convolutions lying transversely of the wheel rim, a through bolt passing through the innermost convolutions of each plurality of springs and an outer sheet metal tyre secured to the ends of said through bolts, substantially as described.

3. Elastic tyres for attachment to the wheels of vehicles, comprising segments of a rim, the external face of which is broader than the internal face, adapted to be rigidly secured to the wheel felly, a sheet metal trough or guide formed in segments and having a groove formed therein to engage the rim segments, spiral springs secured within said trough with the convolutions arranged with their axes transversely of the wheel, cross bolts carried by the innermost convolutions of the springs and an outer metal tyre supported on said cross bolts, a rubber tread and side rings attached to the through bolts to secure said rubber tread in position, substantially as described.

4. Elastic tyres for attachment to the wheels of vehicles comprising segments of a rim, the external face of which is broader than the internal face, means to secure said segments to the felly of a wheel, a sheet metal annular trough formed in segments and having a groove formed therein to engage the rim segments, a plurality of spiral springs arranged side by side the sets of springs being secured within said trough at equidistant points around the circumference of the same, said springs being arranged with the axes of the convolutions lying transversely of the wheel rim, a through bolt passing through the innermost convolutions of each set of springs and an outer sheet metal tyre secured to the ends of said through bolts, a rubber tread and side rings attached to the through bolts to secure said rubber tread in position, substantially as described.

5. Elastic tyres for attachment to the wheels of vehicles comprising segments of a rim, the external face of which is broader than the internal face, means to secure said segments to the felly of a wheel, a sheet metal annular trough formed in segments, and having a groove formed therein to engage the rim segments, a plurality of spiral springs arranged in sets side by side and secured within said trough at equidistant points around the circumference of the same, said springs being arranged in pairs with the convolutions wound in opposite directions and, with the axes of the convolutions lying transversely of the wheel rim, a through bolt passing through the innermost convolutions of each set of springs and an outer sheet metal tyre secured to the ends of said through bolts, a rubber tread and side rings attached to the through bolts to secure said rubber tread in position, substantially as described.

In testimony whereof I have signed my name to this specification.

MAX SCHOEKE.